United States Patent [19]
Xiang et al.

[11] Patent Number: 5,821,410
[45] Date of Patent: Oct. 13, 1998

[54] SCANNING TIP MICROWAVE NEAR FIELD MICROSCOPE

[75] Inventors: Xiao-Dong Xiang, Alameda; Peter G. Schultz, Oakland; Tao Wei, Albany, all of Calif.

[73] Assignee: Regents Of The University Of California, Oakland, Calif.

[21] Appl. No.: 717,321

[22] Filed: Sep. 20, 1996

[51] Int. Cl.[6] .............................. H01J 37/20; G01B 7/34
[52] U.S. Cl. .......................... 73/105; 250/306; 250/307
[58] Field of Search .............................. 73/105; 250/306, 250/307

[56] References Cited

U.S. PATENT DOCUMENTS 5,559,328  9/1996  Weiss et al. .............................. 250/306
5,619,035  4/1997  Weiss et al. .............................. 250/306

OTHER PUBLICATIONS

Bryant, C.A., et al., "Noncontact Technique for the Local Measurement of Semiconductor Resistivity", *The Review of Scientific Instruments*, vol. 36, No. 11, Nov., 1965, pp. 1614–1617.

Fee, M., et al., "Scanning Electromagnetic Transmission Line Microscope with Sub–Wavelength Resolution", *Optics Communications*, vol. 69, No. 3,4, Jan. 1, 1989, pp. 219–224.

Ash, E.A., et al., "Super–Resolution Aperture Scanning Microscope", *Nature*, vol. 237, Jun. 30, 1972, pp. 510–512.

Gutmann, Ronald J., et al., "Microwave Scanning Microscopy for Planar Structure Diagnostics", *IEEE MTT–S Digest*, 1987, pp. 281–284.

Soohoo, R.F., "A Microwave Magnetic Microscope", *Journal of Applied Physics*, vol. 33, No. 3, Mar. 1962, pp. 1276–1277.

Synge, E.H., "A Suggested Method for Extending Microscopic Resolution into the Ultra–Microscopic Region", *Philos. Mag.*, vol. 6, 1928, pp. 356–362.

Tabib–Azar, Massood, et al., "Non–Destructive Characterization of Materials by Evanescent Microwaves", *Meas. Sci. Technology*, vol. 4, 1993, pp. 583–590.

Wei, T., et al., "Scanning Tip Microwave Near–Field Microscope", *Appl. Phys. Lett.*, vol. 68, No. 24, Jun. 10, 1996, pp. 1–3.

Xiang, X. –D., et al., "Use of a Helical Resonator as a Capacitive Transducer in Vibrating Reed Measurements", *Rev. Sci. Instrum.*, vol. 60, No. 9, Sept., 1989, pp. 3035–3040.

*Primary Examiner*—Daniel S. Larkin
*Attorney, Agent, or Firm*—John P. Taylor; Paul R. Martin

[57] ABSTRACT

A microwave near field microscope has a novel microwave probe structure wherein the probing field of evanescent radiation is emitted from a sharpened metal tip instead of an aperture or gap. This sharpened tip, which is electrically and mechanically connected to a central electrode, extends through and beyond an aperture in an endwall of a microwave resonating device such as a microwave cavity resonator or a microwave stripline resonator. Since the field intensity at the tip increases as the tip sharpens, the total energy which is radiated from the tip and absorbed by the sample increases as the tip sharpens. The result is improved spatial resolution without sacrificing sensitivity.

35 Claims, 9 Drawing Sheets

SCANNING TIP MICROWAVE NEAR FIELD MICROSCOPE

The invention described herein arose in the course of, or under, Contract No. DE-AC03-SF00098 between the United States Department of Energy and the University of California for the operation of the Ernest Orlando Lawrence Berkeley National Laboratory. The Government may have rights to the invention.

BACKGROUND OF THE INVENTION

1. Field of the Invention

This invention relates to microwave near field microscopy. More particularly, this invention relates to a microwave near field microscope wherein a thin tip which extends beyond an aperture formed in an endwall of a microwave resonator acts as a point-like evanescent field emitter and detector.

2. Description of the Related Art

The ability to image surface resistance or impedance at high resolution over large areas, i.e., greater than a centimeter in length or width, is important in a number of applications, including the study of defects in semiconducting, conducting, and superconducting thin films; the identification of a minority phase high Tc superconductor among a nonsuperconducting majority phase; the study of insulators with different dielectric constants; and the study of magnetic thin films in magnetic fields. When large libraries of materials of different elemental compositions and structures are generated, such imaging capabilities are required for the rapid screening of superconducting, magnetoresistive, and other novel conducting, semiconducting, and insulating materials.

The classical limit (Abee barrier) to the spatial resolution of any instrument that is based on the propagation of electromagnetic fields over a distance greater than a wavelength (the "far field") is $\lambda/2$. This limit results from the fact that in order to obtain a point-like image, one must retrieve signals that contain all spatial frequency components from the object. However, the spatial frequencies higher than $1/\lambda$, known as evanescent waves, decay exponentially in a propagating field of wavelength $\lambda$. However, E. H. Synge, in an article entitled "A Suggested Method For extending Microscopic Resolution into the Ultra-Microscopic Range", published in Philos. Mag. 6 at pages 356–362 in 1928, proposed a near-field scanning optical system that exceeds the Abee barrier by taking images that depend upon the "near-field" evanescent field. The basic idea is to closely scan a point-like field source over an object so that the evanescent field is still strong enough to interact with the object. Early demonstrations of near-field microwave scanning microscopes were reported by R. F. Soohoo, in an article entitled "A Microwave Magnetic Microscope", published in the Journal of Applied Physics 33 at pages 1276–1277, in 1962; and by Ash and Nicholls, in an article entitled "Super-Resolution Aperture Scanning Microscope", published in Nature, Vol. 237, at pages 510–512, in 1972. The microscope described in the latter article is said to have a spatial resolution of 0.5 mm=X/60. Gutmann et al., in "Microwave Scanning Microscopy For Planar Structure Diagnostics", published in IEEE MTT-S Digest at pages 281–284, in 1987, report achieving a resolution of 0.1 mm=$\lambda/2500$.

In almost all near field microscopes, the point-like source arises from a probe configuration that has an aperture (or gap) of diameter (width) much less than $\lambda/2$. For example, Tabib-Azar et al., in an article entitled "Non-Destructive Characterization of Materials by Evanescent Microwaves", published in Meas. Sci. Technology, 4 at pages 583–590, in 1993, describe a microstrip quarter wavelength resonator having a microstripline tip which forms a gap probe comprising an aperture with a corresponding tip from a grounded conducting plane. A further aperture may be formed beyond the "gap probe" or "aperture probe", which further aperture is said to be connected to the grounded conducting plane to limit the spatial expansion of the field.

Such typical structures include tapered optical/microwave waveguides and an aperture of diameter d on the wall of a microwave cavity with thickness l (which can be considered also as a circular waveguide). However, a basic problem with all such probes is a large loss in intensity of the electromagnetic probe waves radiating from the aperture. Efforts to improve the spatial resolution by reducing the aperture diameter d also reduce the intensity of the probing field, which leads to diminished sensitivity. The microwave power decreases exponentially with increases in the thickness of the material used to form the gap or aperture and with decreases in gap/aperture size d. Thus, attempts at increases in resolution result in losses in signal strength. Generally this limits the near field resolution to a few millimeters or, at best, a few hundred micrometers ($\mu$m). This is true even with high frequencies, i.e., 10 GHz<f<100 GHz.

It would, therefore, be desirable to provide a near field microwave microscope in which such problems are overcome.

SUMMARY OF THE INVENTION

The invention comprises a microwave near field microscope having a novel microwave probe structure wherein the probing field of evanescent radiation is emitted and detected by a sharpened metal tip instead of an aperture or gap. This sharpened tip extends through and beyond the aperture in an endplate or endwall of the microwave resonating device, e.g., a coaxial $\lambda/4$ microwave cavity. Since the field intensity at the tip increases as the tip sharpens, the total energy which is radiated from the tip and absorbed by the sample increases as the tip sharpens. The result is improved spatial resolution without sacrificing sensitivity.

DETAILED DESCRIPTION OF THE INVENTION

Figure 1:
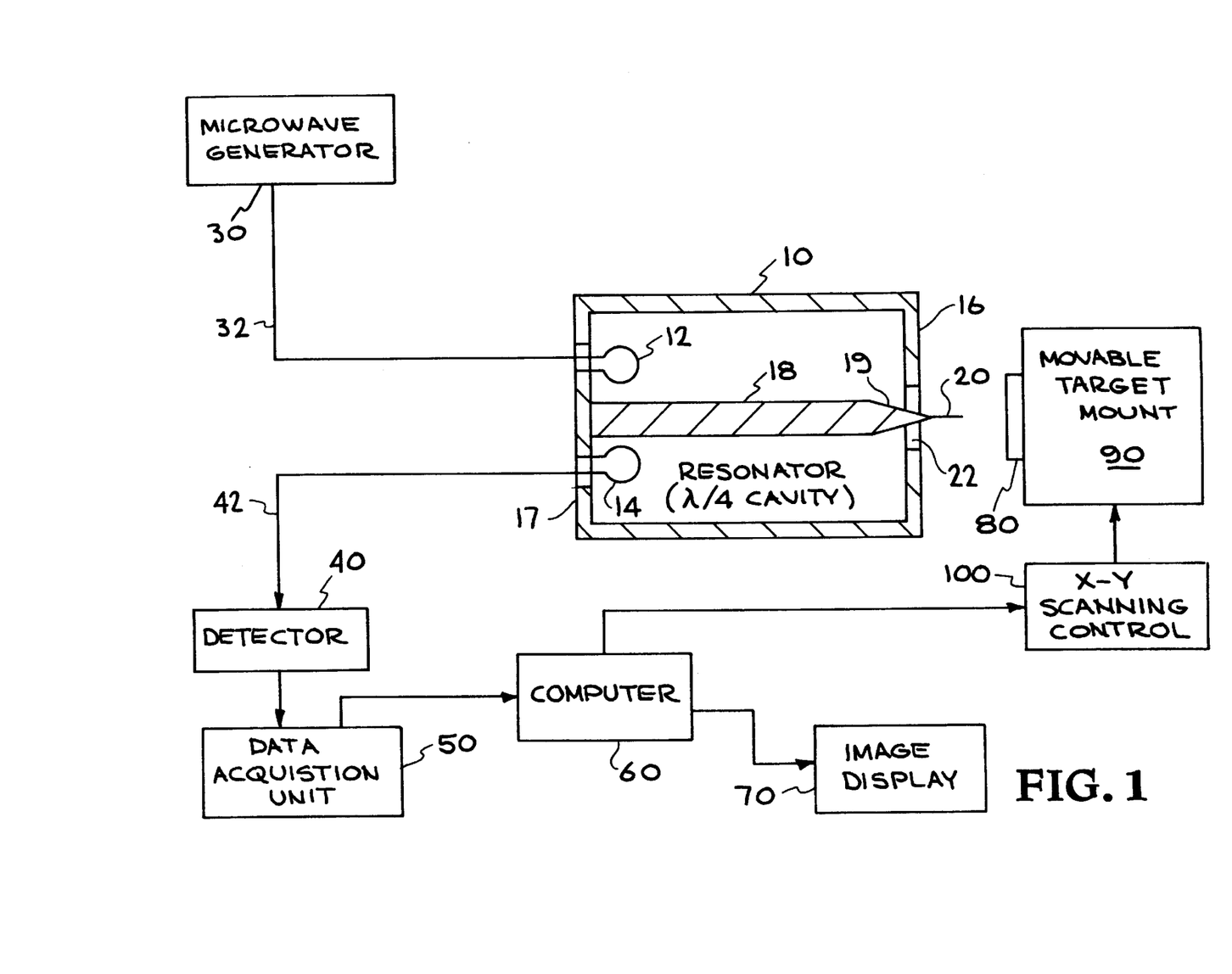
FIG. 1 is a diagrammatic view of the various components which comprise the microwave near field microscope system.

Referring now to FIG. 1, the near field microscope system utilizing the novel probe structure of the invention is shown comprising a microwave resonator such as illustrated microwave cavity 10 having a microwave generator 30 electrically connected to cavity 10 to feed an input signal, through a coaxial line 32, into a tuned loop input 12 on cavity 10. A tuned loop output 14 of cavity 10 is connected to a detector 40 through a second coaxial line 42. Detector 40, in turn, feeds the output signal to a data acquisition unit 50. The data from data acquisition unit 50 is then fed into a computer 60 which converts the data into an image viewable at image display 70 connected to computer 60.

As shown in both FIGS. 1 and 2, a sharpened metal tip 20 which, in accordance with the invention acts as a point-like evanescent field emitter as well as a detector, extends through a cylindrical opening or aperture 22 in endwall 16 of cavity 10, as will be described in more detail below. Mounted immediately adjacent sharpened tip 20 is a sample 80. Sample 80 is mounted to a movable target mount or stepper mechanism 90 which can be moved in either the X or Y axis by an X-Y scanning controller 100 which, in turn, is controlled by signals from computer 60.

Microwave generator 30, detector 40, data acquisition unit 50, computer 60, display 70, movable target mount 90, and X-Y scanning control 100 all comprise commercially available equipment. For example, microwave generator 30 is available from the Programmed Test Source Company as model PTS1000, detector 40 is available from Pasternack Enterprises as model PE8000-50, data acquisition unit 50 is available from National Instruments as model PC-TIO02150, computer 60 may comprise any standard programmable computer, display 70 may comprise any commercially available monitor, movable target mount or stepper mechanism 90 is available from the Ealing Company as model 61-0303, and X-Y scanning control 100 is available from the Ealing Company as model 37-1039. Design principles for a quarter wave cavity, such as microwave cavity 10, may be found in "Radio Engineer Handbook" by F. E. Terman.

Figure 2:
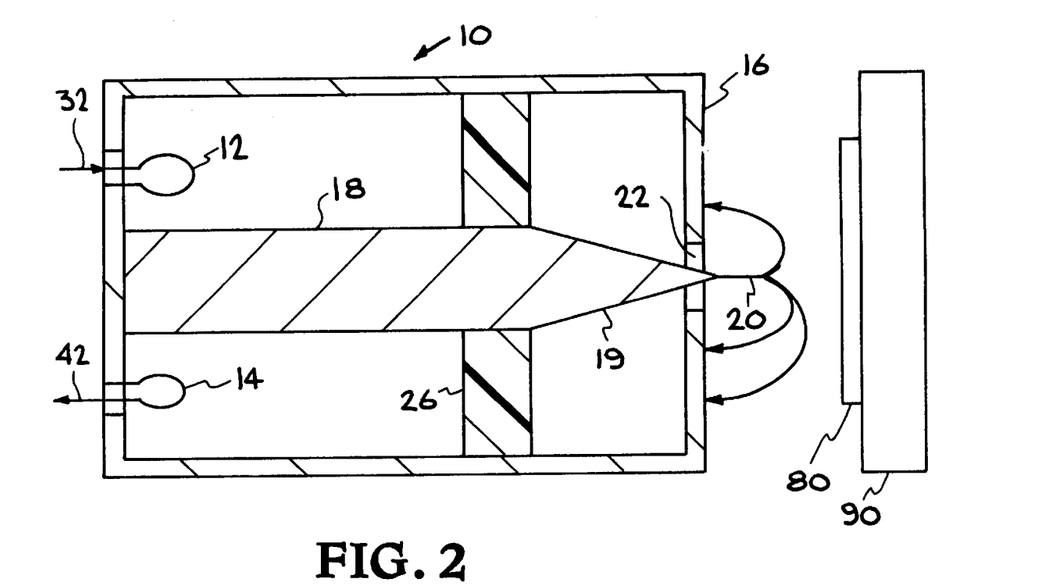
FIG. 2 is a cross-sectional view of one embodiment of the near field microwave microscope of the invention comprising a microwave cavity having a central electrode within the cavity and a sharpened probe tip on one end of the central electrode extending through and beyond an aperture at one end of the cavity.

FIG. 2 shows cavity 10 and sharpened tip 20 in more detail. Cavity 10 comprises a standard quarterwave cylindrical microwave cavity resonator having a central metal conductor 18 with a tapered end 19 to which is attached sharpened metal tip or probe 20. An optional spacer 26, made of an insulation material such as Teflon, may be used to assist in maintaining the central positioning of central conductor 18 coaxially within cavity 10. As shown, probe tip 20 extends through and beyond aperture 22 formed in endwall 16.

Metal Probe Tip Thickness

Metal probe tip 20 has a sharpened end thereon which may be as fine as about 100 Angstroms in diameter. The sharpened end of tip 20 will usually vary in diameter from as small as about 100 Angstroms (10 nm) to as large as about 100 $\mu$m, and preferably varies in diameter from about 200 Angstroms (20 nm) to about 20 $\mu$m. Sharpened metal probe tip 20 may be formed, for example, by electrochemically etching one section of a wire which might have an initial diameter of from about 1 $\mu$m to about 0.2 millimeters (mm) prior to the electrochemical etch. Sharpened metal probe tip 20 may be connected to tapered end 19 of central conductor 18 by welding or any other suitable means which will provide a secure mechanical and electrical connection between tip 20 and tapered probe end 19.

The Diameter of the Aperture

Experimentally, the minimum diameter of aperture 22 has been determined to be the minimum diameter which maintains the high Q and sensitivity of the resonator. To maintain the high Q, the minimum diameter of aperture 22 should be greater than the thickness of endwall 16. That is, endwall thickness t divided by aperture diameter d must be much less than unity (t/d<<1) to maintain high Q (or low loss) of the resonator. Ideally, the endwall should be made by plating a good conducting film (silver or copper) of about 1–2 $\mu$m thick on a low loss insulating plate (~1 mm thick), such as sapphire or $LaAcO_3$ to reduce t while maintaining rigidity (mechanical vibration is not desired). The aperture diameter is also related to the diameter of the metal probe tip which passes through and beyond aperture 22. The minimum aperture diameter, therefore, will usually be at least about 200 Angstroms (20 nm). If the diameter of aperture 22 is too large, however, the resolution will be reduced. It has been found, however, that the diameter of aperture 22 may be as large as 3 mm while still maintaining satisfactory resolution. Typically, the diameter of aperture 22 will range from about 500 Angstroms (50 nm) to about 1 mm.

Extension of Metal Tip through and Beyond Aperture

As shown in both FIGS. 1 and 2, sharpened metal probe tip 20 extends through and beyond cylindrical aperture 22 in endwall 16 of resonator 10. The reason why probe tip 20 must extend beyond aperture 22 a distance comparable to the diameter of aperture 22, in accordance with the invention, is to reduce the effect of the size of the aperture on the resolution. That is, the reason probe tip 20 extends through and beyond aperture 22, instead of terminating at aperture 22, as in prior art structures, is to provide increased spacial resolution, dependent dimensionally on the radius of probe tip 20 rather than the diameter of aperture 22. The extension of probe tip 20 beyond aperture 22 also is helpful and convenient for the scanning of the sample. The length of the portion of sharpened metal probe tip 20 which extends through and beyond aperture 22 is related to the diameter of aperture 22. This length of probe tip 20 extending through and beyond aperture 22 will range from about ⅓ of the diameter of aperture 22 to about 3 time the diameter of aperture 22. The preferred ratio of extension length to aperture diameter has been found to be about 1. The extension length should be further selected to be the length that does not give rise to a large background signal (caused by microwave radiation from the aperture which interacts with the sample) while still giving rise to a strong signal by the tip-sample interaction.

Position of Metal Probe with Respect to Sample

Metal probe tip 20 may be positioned to actually make physical contact with the sample being scanned. However, to inhibit damage to the sharpened end or tip of probe tip 20, it is preferable to provide a spacing between the sample and the probe tip of a very small distance ranging from a few hundred Angstroms to several $\mu$m using, for example, position feedback control schemes such as currently used with scanning tunneling microscopes (STM), atomic force microscopes (AFM), and near field scanning optical microscopes (NSOM). Alternatively, a soft contact ($\leq$mg) between tip and sample (achieved by a small restoring force such as a spring, or magnetic, or electrostatic force) can also be used in some situations.

The Microwave Cavity

Still referring to the embodiment of FIGS. 1 and 2, cavity 10, including endwalls 16 and 17, is formed of metal but preferably comprises a diamagnetic material such as copper or silver, rather than a ferromagnetic material so that a modulating magnetic field can be used in connection with cavity 10. The diameter of cavity 10 will determine the Q factor of the cavity, while the length of cavity 10 will equal the wavelength (at the resonant frequency) divided by 4, i.e. cavity length=$\lambda$/4 (a quarter wavelength cavity). Usually the cavity diameter should be large enough and the diameter ratio of cavity 10 to central electrode 18 should be about 3–5 to provide a satisfactory Q. The Q of a microwave cavity or resonator may be defined as the quality factor of the cavity, and should be kept as high as possible. The sensitivity of the near field microscope can be improved by increasing the input microwave power and unloaded Q ($Q_u$) of the resonator with an optimal coupling which is achieved by adjusting the coupling strength so that the loaded Q ($Q_l$) is ⅔ of $Q_u$.

Power Levels

The near field microwave microscope of the invention will normally be operated at a power level ranging from about 0.1 watts to about 1 watt, and at a frequency ranging from as low as about 100 MHz to as high as about 10 GHz. Within this frequency range, quarter wavelength microwave cavities of practical size may be utilized to provide a resolution as high as about 0.1 $\mu$m. However, it should be noted that central electrode 18, having sharpened tip 20 thereon, could comprise an optical fiber which has been drawn to a fine tip and then metallized on the surface, in which case the apparatus of the invention could be used both at microwave frequencies and at optical frequencies.

Experimental Results

To illustrate the effectiveness of the microwave near field microscope of the invention, as shown in the embodiment of FIGS. 1 and 2, a room-temperature scan was made of two 1000 Angstroms (100 nm) thick niobium wires coated on a silicon wafer. The niobium wires were 10 $\mu$m wide and separated by 20 $\mu$m. The two wires were respectively coated with 1000 Angstroms (100 nm) and 2000 Angstroms (200 $\mu$m) of $SiO_2$. The sample was fixed (facing down) on a sample holder that allowed vertical movement. The image was obtained by scanning the tip of the resonator under the sample with direct physical contact (by gravitational force) between the tip and the sample surface. The tip was formed from copper wire which had been broken with a pulling force, and had an estimated radius of about 10 $\mu$m. In this measurement, the resonator was driven at a constant frequency of 672 MHz, slightly higher than the resonant frequency of the resonator (671 MHz). The change in the resonant frequency was measured by recording the output power at the input frequency (as measured as the detector output voltage). As the tip scanned the niobium wires, the resonant frequency was reduced due to the higher conductivity of niobium. The lines and separation of the lines were clearly resolved, indicating a lateral spatial resolution of about 5 $\mu$m (~$\lambda$/100,000). The 1000 Angstrom (100 nm) difference in the tip to niobium distance (due to the respective 1000 Angstrom (100 nm) versus 2000 Angstrom (200 nm) $SiO_2$ overlayers on the two niobium lines) results in a difference in contrast levels that is roughly 20 times larger than the background noise, indicating that the depth resolution using the near field microscope of the invention is much better than 1000 Angstroms (100 nm).

Other Embodiments

Figure 3:
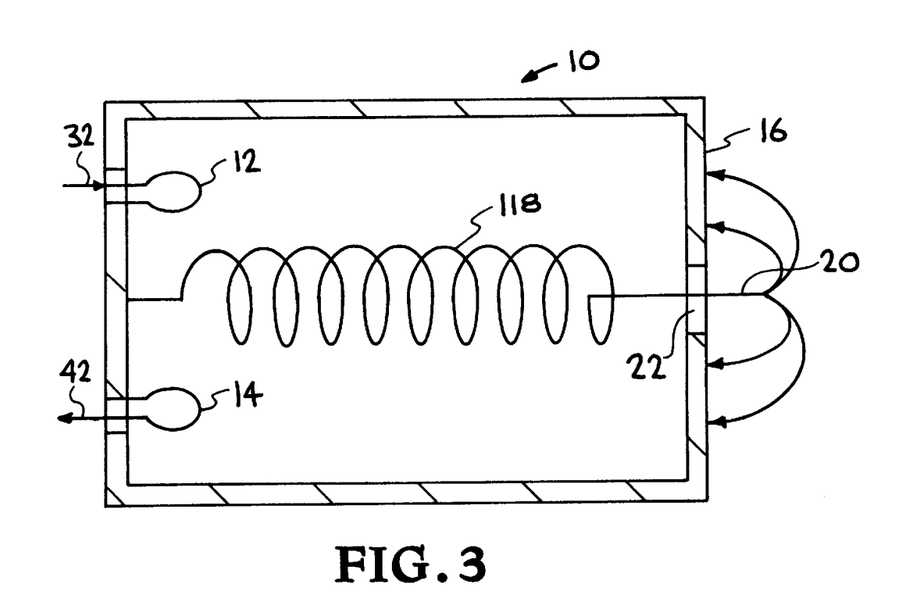
FIG. 3 is a cross-sectional view of an alternate embodiment of the invention wherein a helical coil is substituted for the central electrode in the structure shown in FIG. 2.

Turning now to FIG. 3, another embodiment of the invention is illustrated wherein central metal electrode 18 has been replaced with a helical coil of metal wire 118 which, in turn, is connected to sharpened metal probe tip 20 which, as in the previous embodiment, extends beyond aperture 22 in endwall 16 of cavity 10. The advantage of replacing the coaxial electrode 18 with a helical coil 118 is for use at lower frequencies, i.e., about 100 MHz to about 300 MHz, while maintaining high Q.

Figure 4:
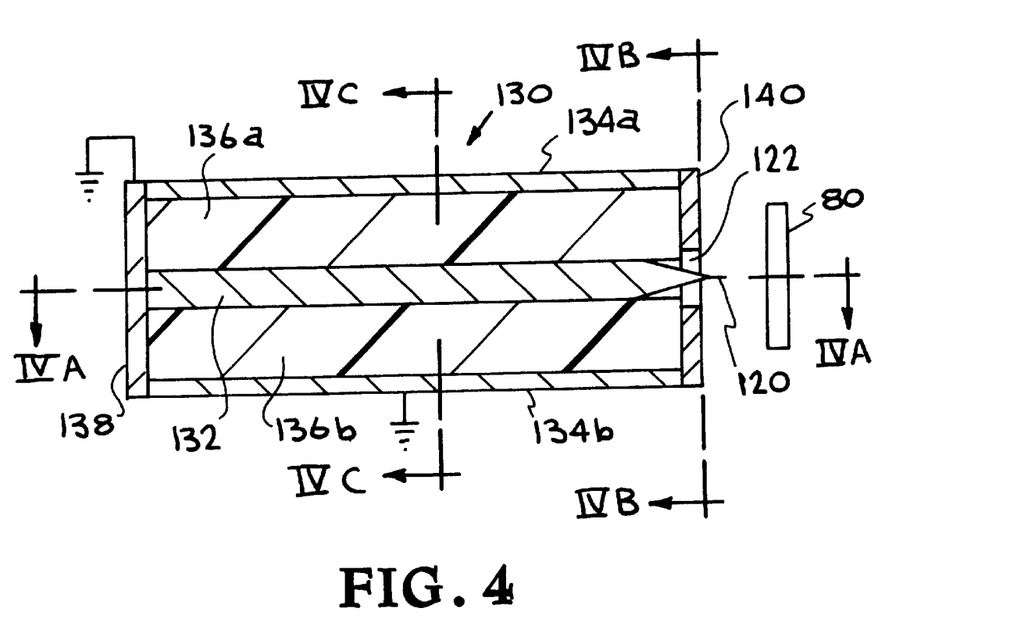
FIG. 4 is a vertical side-sectional view of an alternate embodiment of the invention wherein a planar symmetric stripline resonator having a sharpened probe tip extending from one end thereof and through an aperture in a grounded conducting plane is substituted for the microwave cavity structure shown in FIG. 2.
Figure 4A:
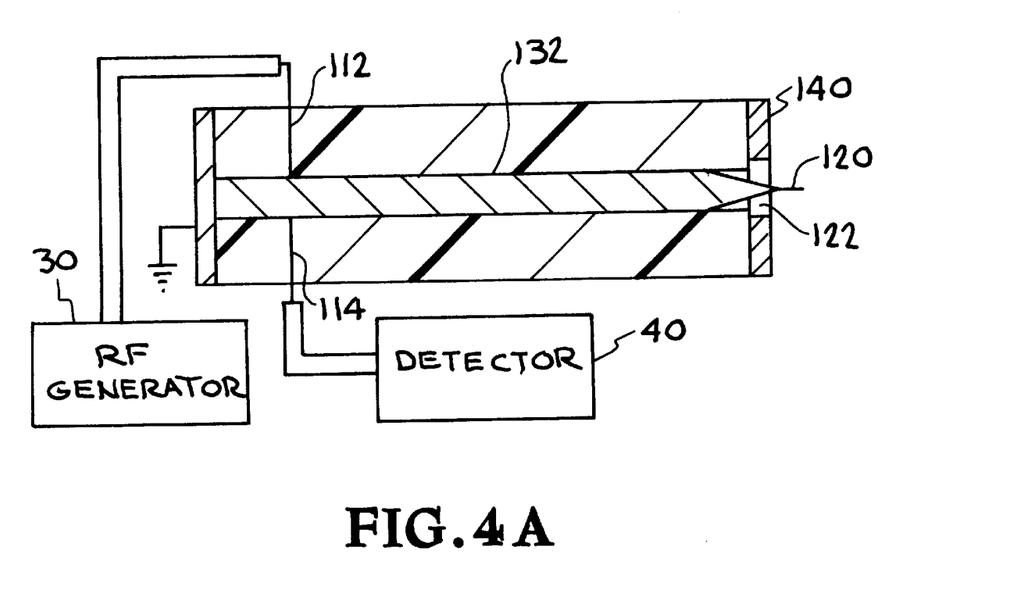
FIG. 4A is a top-sectional view of the stripline resonator of FIG. 4, taken along lines IVA—IVA, to show the input and output coupling to the central conductor of the stripline and the position of the central conductor in the stripline resonator.

FIG. 4 shows yet another embodiment of the invention wherein a stripline resonator 130 replaces cavity 10 and comprises a first central electrode 132 separated from an upper conductive ground plane 134a by an insulator 136a, and separated from a lower conductive ground plane 134b by an insulator 136b. A metal endwall 138 connects ground planes 134a and 134b to one end of central electrode 132. As shown in FIG. 4A, central electrode 132 is connected to microwave (RF) generator 30 via input 112 and connected to detector 40 via output 114.

Figure 4B:
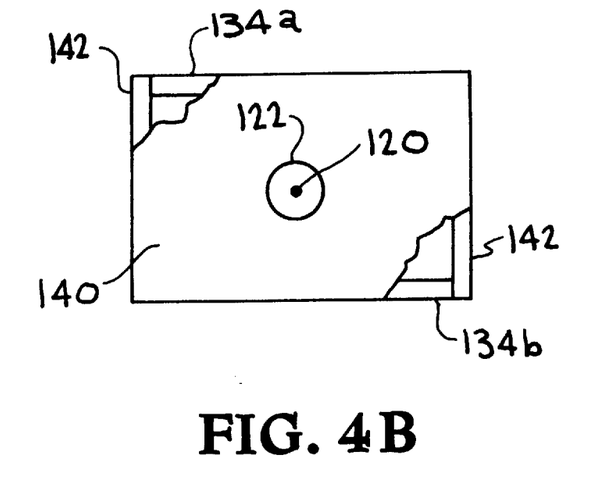
FIG. 4B is an end view of the tip end of the stripline resonator of FIG. 4, taken along lines IVB—IVB, with the aperture through which the tip extends shown formed on the end of the stripline resonator.
Figure 4C:
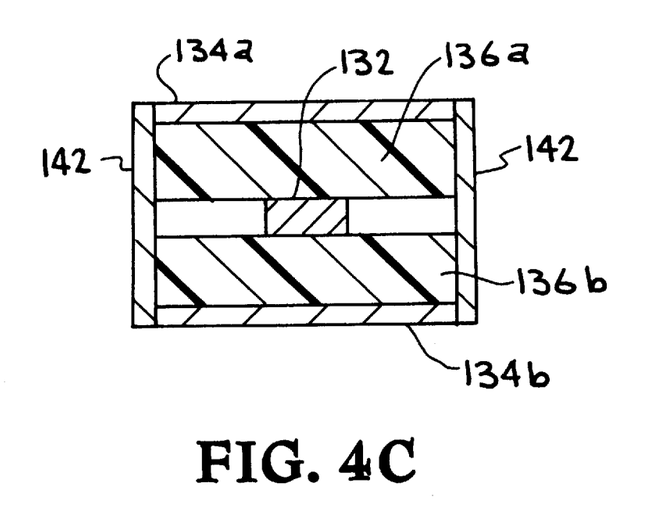
FIG. 4C is a cross-sectional end view of the microwave stripline resonator structure of FIG. 4, taken along lines IVC—IVC, to further illustrate the positioning of the central conductor within the stripline resonator.

The opposite end of stripline resonator 130 is covered with a metal film 140, as shown in FIGS. 4 and 4A, but best seen in FIG. 4B, which has a central opening therein defining a central aperture 122 surrounding a probe tip 120 connected to central electrode 132. The distance which probe 120 extends beyond aperture 122 and the relationship of this distance to the diameter of aperture 120 remain the same as the previously discussed relationship of probe tip 20 to aperture 22. As shown in both FIGS. 4B and 4C, the sidewalls of stripline resonator 130 may be optionally covered with a conductive film 142 which will further reduce any leakage from the stripline resonator, making it more functionally equivalent to microwave cavity 10 of the first embodiment. It should be noted that while a symmetric stripline has been illustrated (and is preferred to obtain a symmetric background), an asymmetric microstrip resonator could also be used, which would be easier to make, but which could give rise to undesirable asymmetric background signals.

Figure 5:
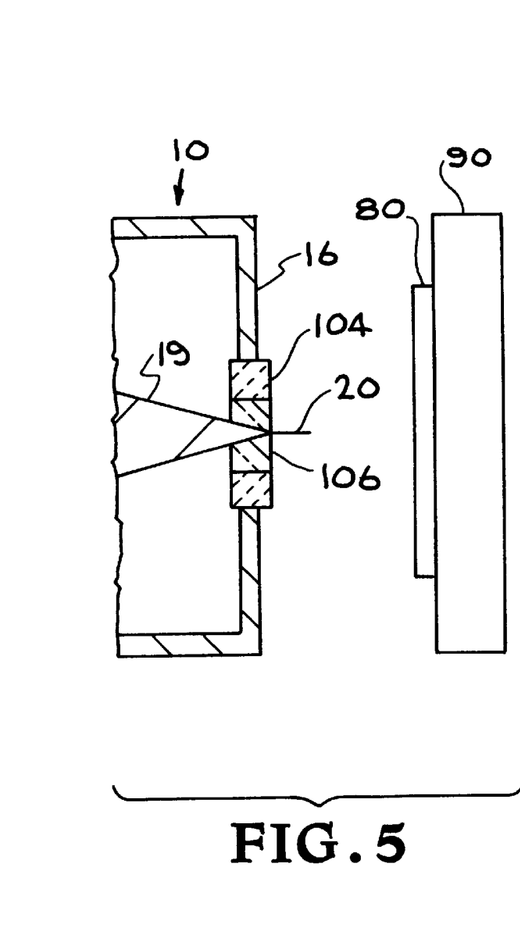
FIG. 5 is a fragmentary cross-sectional view of a variation of the structure of FIG. 2 with a piezoelectric member added to the cavity to vibrate the sharpened probe tip with respect to the sample.

Turning now to FIG. 5, an optional additional feature is illustrated wherein the resonator tip may be vibrated to increase the sensitivity using an AC modulated mode (with lock-in detection) by vibration modulation of tip-sample distance. Using AC mode, noise can be significantly reduced and sensitivity can be greatly increased due to the advantage of a lock-in detection technique. A feedback scheme can then be used to maintain the tip to sample distance at a constant, e.g., less than about 100 nm. In FIG. 5, piezoelectric material 104 may be mounted in endwall 16 of cavity 10, with an insulation sleeve 106 such as sapphire bonded to both piezoelectric material 104 and tip 20 whereby tip 20 may be vibrated, with respect to sample 80, during the scan. When tip 20 is close to the surface of sample 80, mechanical damping of tip 20 may be sensed by measuring the mechanical resonant frequency and Q of the tip.

Figure 6:
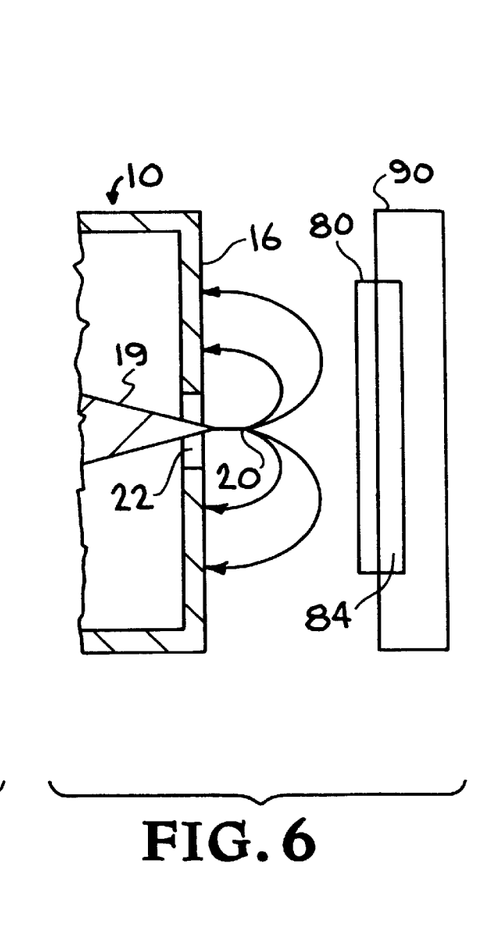
FIG. 6 is a fragmentary cross-sectional view of another variation of the structure of FIG. 2 with a piezoelectric member added to the sample support to vibrate the sample with respect to the sharpened probe tip.

FIG. 6 alternatively shows the mounting of a piezoelectric material 84 on the front face of target mount 90 beneath sample 80, whereby sample 80, rather than tip 20, will be vibrated, with respect to tip 20, during the scan.

Figure 7:
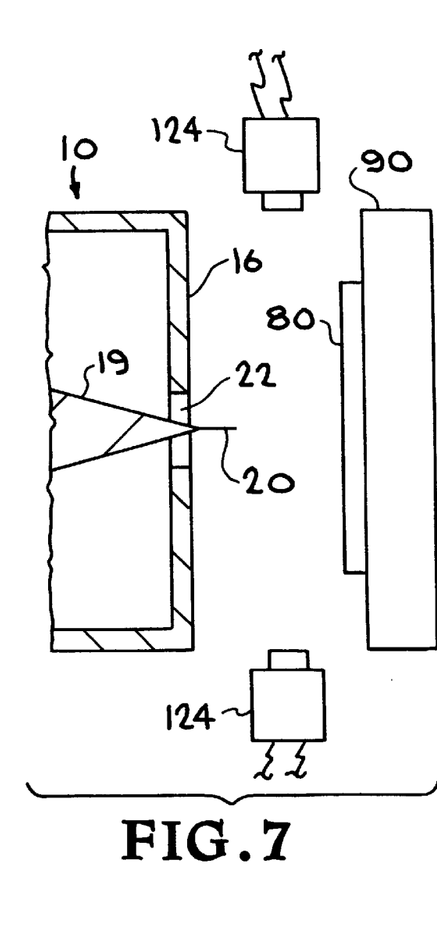
FIG. 7 is a fragmentary cross-sectional view of yet another variation of the structure of FIG. 2 with a magnetic coils provided to modulate the microwave adsorption of a magnetic sample.

Turning to FIG. 7, yet another embodiment is shown wherein magnetic modulation may be provided by magnetic coils 124 mounted outside of cavity 10 adjacent sample 80 to provide a magnetic field which can modulate the microwave interaction with the sample during the scan.

Figure 8:
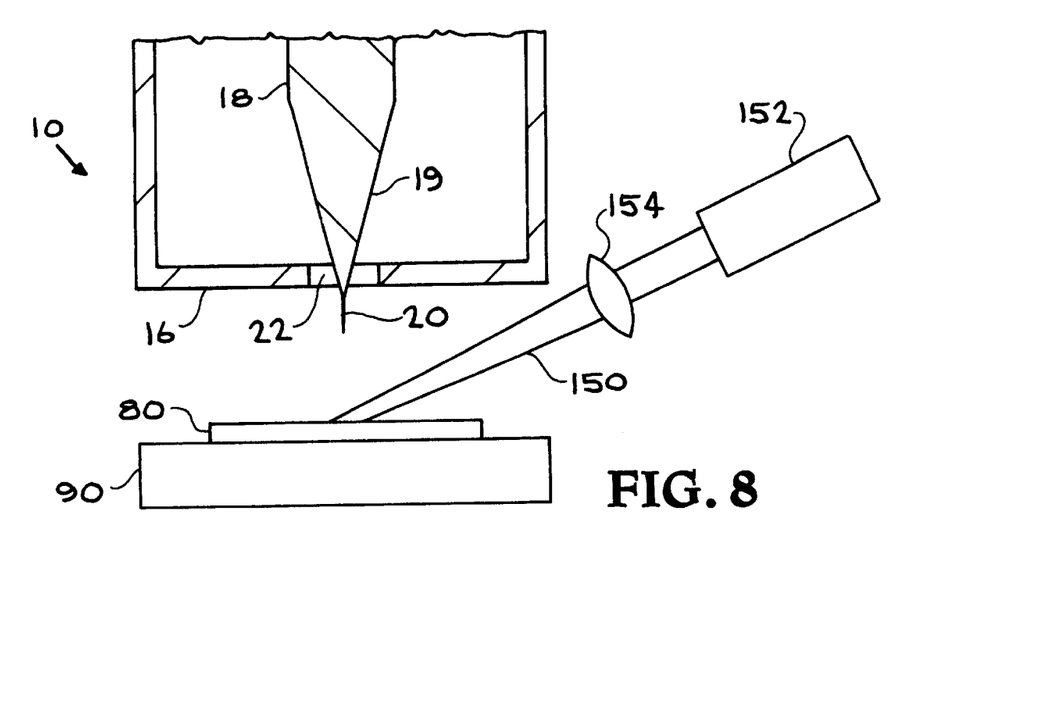
FIG. 8 is a fragmentary cross-sectional view of yet another embodiment of the invention with a laser beam provided to modulate the conductivity of the sample through photo-induced conductivity.

FIG. 8 shows the use of a light beam such as laser beam 150 from a beam source 152 and lens 154 which can be used to modulate the sample signal (when the sample is a material which is photosensitive) into an ac signal and lock-in technique which can be used to increase the signal to noise ratio.

Figure 9:
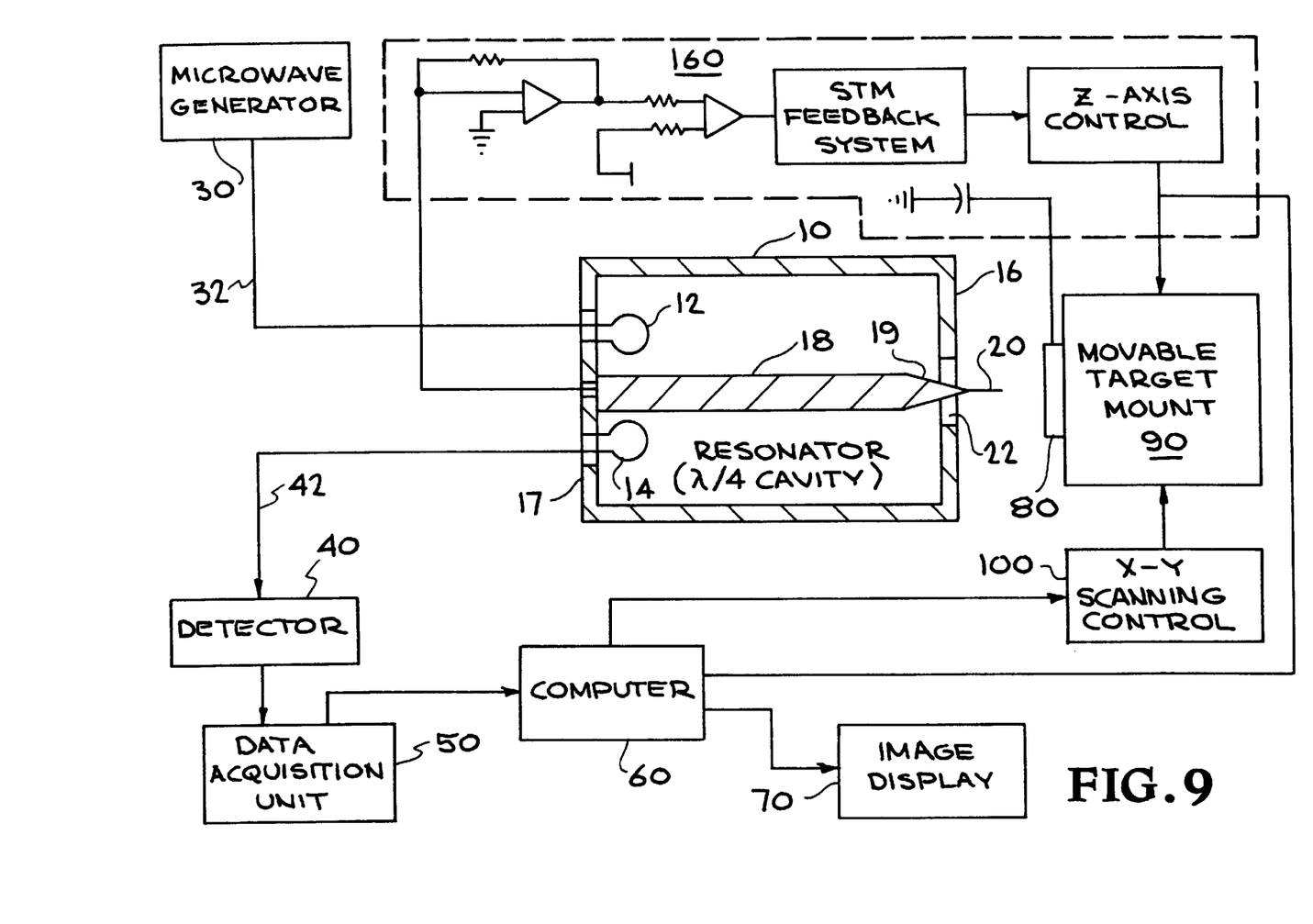
FIG. 9 is a diagrammatic view of the various components which comprise the scanning tip microwave microscope of the invention similar to the view of FIG. 1, but with additional circuitry added to combine the scanning tip microwave microscope of the invention with scanning tunneling microscope (STM) technology.

FIG. 9 shows a diagrammatic view of the various components which comprise the scanning tip microwave microscope of the invention similar to the view of FIG. 1, but with additional circuitry added, as shown within dotted lines 160, to combine the scanning tip microwave microscope of the invention with scanning tunneling microscope (STM) technology by adding feedback electronics comprising a scanning tunneling microscope (STM) feedback system and Z axis control to the Z axis. By combining the structure of the invention with STM technology, it is possible to make large area scanning with atomic resolution (STM) zoom in.

Figure 10:
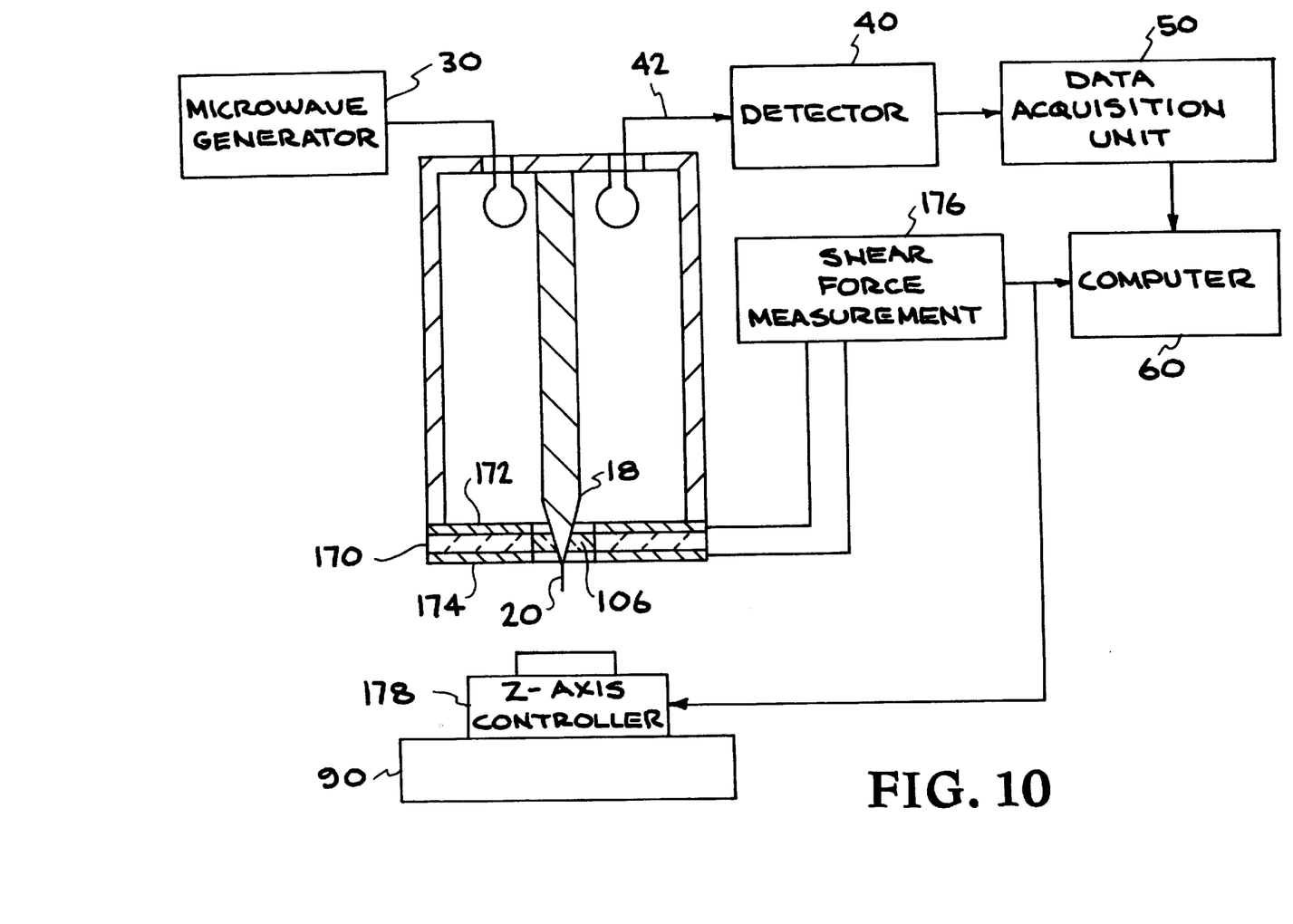
FIG. 10 is a diagrammatic view of the various components which comprise the scanning tip microwave microscope of the invention similar to the view of FIG. 1, but with additional circuitry added to combine the scanning tip microwave microscope of the invention with atomic force microscope (AFM) technology.
Figure 10A:
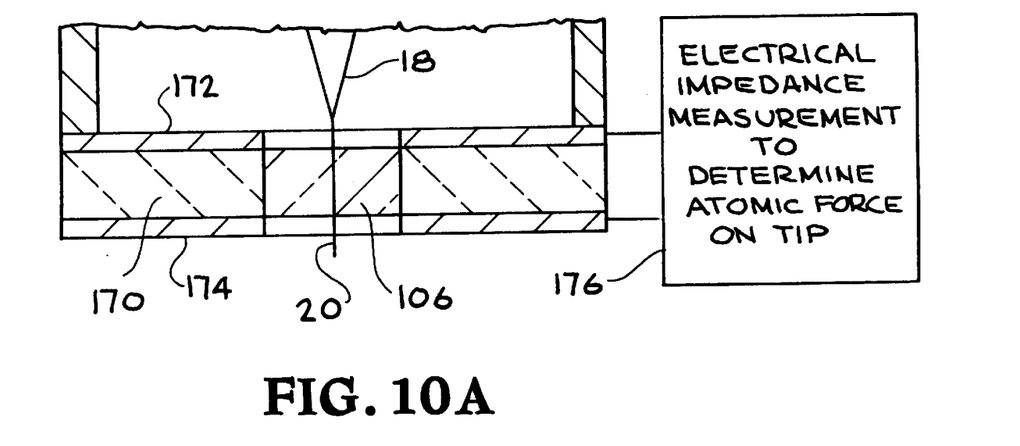
FIG. 10A is a fragmentary vertical side-section view of the structure of FIG. 10 showing details of the shear force measurement used to sense the atomic force on the tip by tip-sample interaction.

FIG. 10 is a diagrammatic view of the various components which comprise the scanning tip microwave microscope of the invention similar to the view of FIG. 1, but with additional circuitry added to combine the scanning tip microwave microscope of the invention with atomic force microscope (AFM) technology. As best seen in FIG. 10A, a piezoelectric element 170 is provided with electrodes 172 and 174 on opposite faces thereof forming all or part of the endwall of a cavity resonator, similar to previously described cavity resonator 10. As in the structure shown in FIG. 5, an insulator such as sapphire member 106 is bonded both to tip 20 and piezoelectric member 170. Electrodes 172 and 174 are connected to an impedance measurement device 176 to provide a shear force measurement used to sense the atomic force on the tip by tip-sample interaction. Measurement device 176 feeds an output signal to computer 60 resulting in a feedback signal being fed to Z axis positioning controller 178.

Figures 11, 11A, 12:
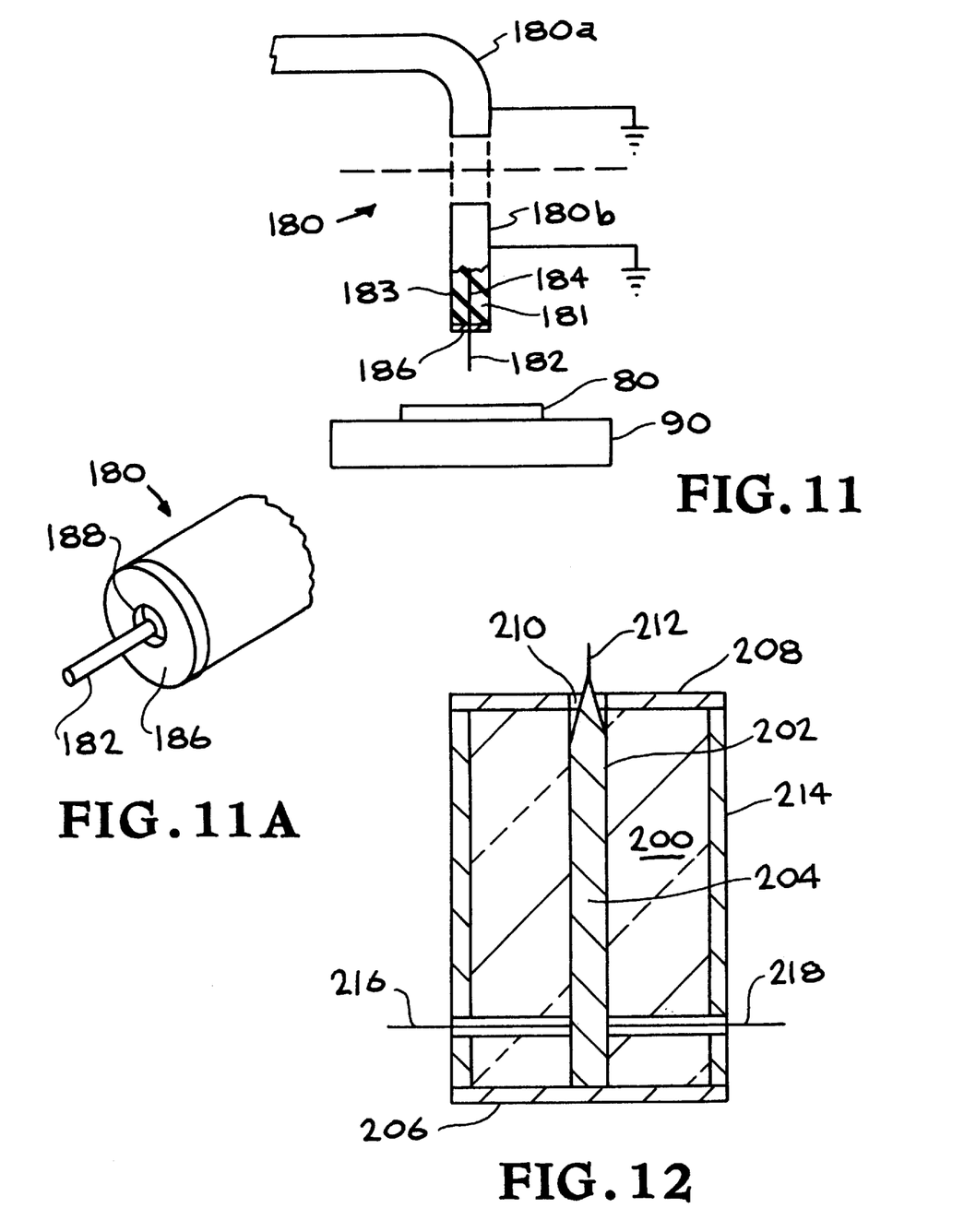
FIG. 11 is a diagrammatic view of yet another embodiment of the invention using a coaxial cable with a sharpened point on the central conductor protruding from the end of the cable.
FIG. 11A is an end view of the coaxial cable illustrated in FIG. 11, showing the conductive coating formed over the end surface of the dielectric material with a central aperture shown formed in the conductive coating around the central conductor.
FIG. 12 is a vertical side section view of yet another embodiment of the invention wherein the scanning tip microwave microscope of the invention is constructed using a solid insulation such as a solid cylinder having a central bore with a conductor therein and metallization on both endwalls of the cylinder, with one endwall having a central aperture formed in the metallization and a central solid tip connected to the central conductor protruding through and beyond the aperture formed in the metallization.

Turning now to FIGS. 11 and 11A, yet another embodiment of the invention comprising a coaxial cable 180 with a sharpened point 182 on the central conductor 184 protruding from the end of the cable. Coaxial cable 180 is provided with a conventional insulator 181 surrounding central conductor 184 and a grounded shield 183 surrounding insulator 181. As best seen in FIG. 11A, the end of coaxial cable 180 is coated with a conductive coating 186 which surrounds central tip 182 of central electrode 184, but which terminates to provide an aperture 188 surrounding tip 182, as in the previous embodiments of FIGS. 1–2, and 4. Coaxial cable 180 may be connected to the same external components as shown in FIG. 1. It should be noted that coaxial cable 180 is illustrated in two parts 180a and 180b merely to facilitate calibration of the coaxial cable resonator.

In FIG. 12, another embodiment of the invention is illustrated, wherein the scanning tip microwave microscope of the invention is constructed using a solid insulation member such as a solid cylinder 200 formed of sapphire and provided with a central bore 202 into which a metal conductor 204 is inserted, e.g., a metal rod having the same OD as the ID of central bore 202. Metallization 206 is provided on bottom endwall of cylinder 200, and metallization 208, having a central opening or aperture 210 is provided on the opposite endwall of cylinder 200. Central opening 210 comprises an aperture protruding through and beyond which is a central solid metal tip 212 connected to central conductor 204. The sidewall of cylinder 200 is also provided with a metallization as shown at 214. A microwave generator, such as generator 30 of FIG. 1, and a detector, such as detector 40 of FIG. 1, may be respectively connected to input 216 and output 218.

Thus, the invention provides a microwave near field microscope of improved sensitivity due to the use of a sharpened tip probe instead of an aperture acting as the field emitter and detector, with the tip of the probe extending through and beyond an aperture formed in the endwall of the resonator to provide a high intensity field in close proximity to the sample being scanned.

Having thus described the invention what is claimed is:

1. A microwave near field microscope comprising a microwave resonator having a conductive electrode disposed in a region of said microwave resonator and a conductive probe tip at one end of said conductive electrode, said conductive probe tip extending from said region of said microwave resonator through and beyond an aperture in an endwall of said microwave resonator and wherein said endwall is conductive and is electrically coupled to said microwave resonator.

2. The microwave near field microscope of claim 1 wherein the diameter of said aperture in said endwall of said microwave resonator ranges from about 200 Angstroms (20 nm) to about 3 mm.

3. The microwave near field microscope of claim 2 wherein the distance which said probe tip extends beyond said aperture toward said sample ranges from about ⅓ to about 3 times the diameter of said aperture.

4. The microwave near field microscope of claim 3 wherein said probe tip has a diameter, at the point of said probe tip ranging from about 100 Angstroms (10 nm) to about 100 $\mu$m.

5. The microwave near field microscope of claim 3 wherein the thickness of said wall having said aperture therein is less than the diameter of said aperture.

6. The microwave near field microscope of claim 3 wherein said microwave resonator further comprises a solid electrode coaxially mounted in said microwave resonator and electrically and mechanically connected in said microwave resonator to said probe tip.

7. The microwave near field microscope of claim 3 wherein said microwave resonator further comprises a helical central electrode coaxially mounted in said microwave resonator and electrically and mechanically connected in said microwave resonator to said probe tip.

8. The microwave near field microscope of claim 1 wherein the diameter of said aperture in said endwall of said microwave resonator ranges from about 500 Angstroms (50 nm) to about 1 mm.

9. The microwave near field microscope of claim 1 wherein said microwave resonator comprises a conductive enclosure which defines said region and said conductive endwall is electrically part of said microwave resonator.

10. A microwave near field microscope comprising a microwave resonator having a central electrode and a sharpened metal probe tip at one end of said electrode extending from said microwave resonator through an aperture in an endwall of said microwave resonator a distance beyond said aperture ranging from about ⅓ to 3 times the diameter of said aperture.

11. The microwave near field microscope of claim 1 wherein the diameter of said aperture in said endwall of said resonator ranges from about 200 Angstroms (20 nm) to about 3 mm.

12. The microwave near field microscope of claim 11 wherein the ratio of the distance which said probe tip extends beyond said aperture toward said sample to the diameter of said aperture is about 1.

13. The microwave near field microscope of claim 11 wherein said central electrode in said resonator comprises a helical central electrode.

14. The microwave near field microscope of claim 1 wherein the diameter of said aperture in said endwall of said resonator ranges from about 500 Angstroms (50 nm) to about 1 mm.

15. The microwave near field microscope of claim 1 wherein said probe tip has a diameter, at the point of said probe tip ranging from about 100 Angstroms (10 nm) to about 100 $\mu$m.

16. The microwave near field microscope of claim 1 wherein said probe tip has a diameter, at the point of said probe tip ranging from about 200 Angstroms (20 nm) to about 20 $\mu$m.

17. The microwave near field microscope of claim 1 wherein the thickness of said resonator endwall having said aperture therein is less than the diameter of said aperture.

18. The microwave near field microscope of claim 1 wherein said resonator is connected to a microwave signal generator operating in a frequency range of from about 100 MHz to about 10 GHz.

19. The microwave near field microscope of claim 1 wherein said central electrode in said microwave resonator comprises a solid central electrode.

20. The microwave near field microscope of claim 1 wherein said microwave resonator comprises a microwave stripline resonator having a first electrode electrically and mechanically connected to said probe tip and at least one ground plane electrode, electrically insulated from said first electrode; and said aperture is located in a grounded endwall portion of said resonator.

21. The microwave near field microscope of claim 1 which further includes a piezoelectric member for vibrating said probe tip relative to said sample.

22. The microwave near field microscope of claim 1 which further includes a sample holder adjacent said microwave cavity and a piezoelectric member in said sample holder for vibrating said sample relative to said probe tip.

23. The microwave near field microscope of claim 1 which further includes one or more magnetic coils adjacent said sample to generate a magnetic field in said sample.

24. A microwave near field microscope comprising a microwave resonator having a helical central electrode and a sharpened metal probe tip at one end of said electrode extending from the resonator through and beyond an aperture ranging in diameter from about 200 Angstroms (20 nm) to about 3 mm in an endwall of said microwave resonator toward a sample, said extension of said metal probe tip beyond said aperture to said sample ranging from about ⅓ to 3 times said diameter of said aperture.

25. A microwave near field microscope comprising a microwave stripline resonator which comprises:
   a) a central electrode;
   b) at least one ground plane electrode separated from said central electrode by a layer of insulation;
   c) a circular aperture in a metallized endwall formed on said stripline resonator and connected to said ground plane electrode; and
   d) a sharpened metal probe tip electrically and mechanically connected to said central electrode and extending through and beyond said aperture in said metallized endwall of said microwave stripline resonator toward a sample a distance beyond said aperture and toward said sample ranging from about ⅓ to 3 times the diameter of said aperture.

26. The microwave near field microscope of claim 25 wherein the diameter of said aperture in said metallized endwall of said microwave stripline resonator ranges from about 200 Angstroms (20 nm) to about 3 mm.

27. The microwave near field microscope of claim 25 wherein the diameter of said aperture in said endwall of said resonator ranges from about 500 Angstroms (50 nm) to about 1 mm.

28. The microwave near field microscope of claim 25 wherein said probe tip has a diameter, at the point of said probe tip ranging from about 100 Angstroms to about 100 $\mu$m.

29. A microwave near field microscope comprising a microwave resonator which comprises:

a) a cylindrical insulation member;

b) a central bore in said cylindrical insulation member;

c) a metal member comprising a central electrode in said central bore;

d) metallization formed over each end of said cylindrical insulation member;

e) a circular aperture in the metallization formed over one end of said cylindrical insulation member; and f) a sharpened metal probe tip electrically and mechanically connected to said central electrode and extending through and beyond said aperture in said metallization formed over one end of said cylindrical insulation member toward a sample a distance beyond said aperture and toward said sample ranging from about $\frac{1}{3}$ to 3 times the diameter of said aperture.

30. The microwave near field microscope of claim 29 wherein said cylindrical insulation member of said microwave resonator has further metallization formed over a sidewall of said cylindrical insulation member, said further metallization electrically connected to said metallization formed over each end of said cylindrical insulation member.

31. The microwave near field microscope of claim 30 wherein the diameter of said aperture in said metallized endwall of said microwave resonator ranges from about 200 Angstroms (20 nm) to about 3 mm.

32. The microwave near field microscope of claim 30 wherein the diameter of said aperture in said metallized endwall of said microwave resonator ranges from about 500 Angstroms (50 nm) to about 1 mm.

33. The microwave near field microscope of claim 29 wherein said probe tip has a diameter, at the point of said probe tip ranging from about 100 Angstroms (10 nm) to about 100 $\mu$m.

34. A microwave near field microscope comprising a coaxial microwave resonator which comprises:

a) a central electrode;

b) a cylindrical sheathing of insulation around said central electrode;

c) a grounded metallic shield layer surrounding the sidewall of said cylindrical sheathing of insulation;

d) a circular aperture in a metallized endwall formed on said cylindrical sheathing of insulation, said metallized endwall electrically connected to said grounded metallic shield; and e) a sharpened metal probe tip electrically and mechanically connected to said central electrode and extending through and beyond said aperture in said metallized endwall formed on said cylindrical sheathing of insulation, said metal probe tip extending toward a sample a distance beyond said aperture and toward said sample ranging from about $\frac{1}{3}$ to 3 times the diameter of said aperture.

35. A method of operating a microwave near field microscope, said method comprising:

a) inputting a microwave signal into a microwave resonator;

b) resonating said microwave signal in said microwave resonator which has an electrode disposed in a region of said microwave resonator, said electrode being electrically coupled to a conductive probe tip which extends beyond an endwall of said microwave resonator, said endwall being conductive and electrically coupled to said microwave resonator; and c) creating an external electromagnetic field from said resonating in said microwave resonator, said external magnetic field being created between said conductive probe tip and said conductive endwall electrically coupled to said microwave resonator.

* * * * *